United States Patent [19]

Eno

[11] 3,831,055

[45] Aug. 20, 1974

[54] RASTER DISPLAY GENERATOR

[75] Inventor: Frederick L. Eno, North Stonington, Conn.

[73] Assignee: The United States of America as represented by the Secretary of the Navy, Washington, D.C.

[22] Filed: Jan. 2, 1973

[21] Appl. No.: 320,045

[52] U.S. Cl............................. 315/27 TD, 307/228
[51] Int. Cl.......................................... H01j 29/70
[58] Field of Search............. 315/18, 19, 22, 27 TD, 315/27 R; 307/228

[56] References Cited
UNITED STATES PATENTS

| | | | |
|---|---|---|---|
| 3,325,802 | 6/1967 | Bacon | 315/27 R |
| 3,383,549 | 5/1968 | Huffnagle | 315/27 TD |
| 3,419,750 | 12/1968 | Rothschild et al. | 315/27 TD |
| 3,659,115 | 4/1972 | Montgomery | 315/27 TD |

Primary Examiner—Maynard R. Wilbur
Assistant Examiner—J. M. Potenza
Attorney, Agent, or Firm—Richard S. Sciascia; Arthur A. McGill; Prithvi C. Lall

[57] ABSTRACT

A raster display generator to display the output of a spectrum analyzer in the form of a raster display on a storage oscilloscope. The generator comprises a step generator wherein a preselected capacitor is charged uniformly in discrete steps, by a constant current generator, one step per sweep of the analyzer, and the resulting D.C. voltage level is superimposed on the spectrum output of the analyzer. The step generator circuit is controlled by the unblanking pulse output of the analyzer so that the capacitor is charged only during the sweep flyback interval, the period of time between the end of one sweep and the start of the next. The unblanking pulse remains at a fixed voltage level during the sweep and goes to zero volts during the flyback interval.

6 Claims, 2 Drawing Figures

PATENTED AUG 20 1974     3,831,055

RASTER DISPLAY GENERATOR

STATEMENT OF GOVERNMENT INTEREST

The invention described herein may be manufactured and used by or for the Government of the United States of America for governmental purposes without the payment of any royalties thereon or thereafter.

BACKGROUND OF THE INVENTION

A spectrum analyzer provides, in general, a continuous real-time analysis of an input signal in various frequency bands. The analyzed output is a spectrum of amplitude vs. frequency which can be displayed on an oscilloscope. To produce a time history of these amplitude vs. frequency sweeps, a high speed optical strip chart recorder can be employed. However, the use of such a strip chart recorder has the disadvantage that large quantities of expensive photo-sensitive paper may be wasted in the data analysis process while the operator views the results. Furthermore, with this method, the real-time analysis is lost because the operator does not see the results until the chart paper has been printed and ejected by the recorder and is exposed to light to develop the print.

SUMMARY OF THE INVENTION

The raster display generator of the present invention is an electronic circuit which acts as an interface circuit between an electronic spectrum analyzer and a storage oscilloscope The generator comprises a group of capacitors, wherein a preselected capacitor of the group is charged uniformly in discrete steps at the command of a signal from the spectrum analyzer, thus producing a raster display voltage. The raster display voltage signal thus produced, is added on to the output of the analyzer, which then is displayed on the storage oscilloscope. Charging of the preselected capacitor of the group in the raster display generator is attained only during the sweep flyback interval, the period of time between the end of one sweep and the start of the next sweep of the spectrum analyzer. In the raster display generator circuit, a cutoff voltage level detector is provided for the charge on the capacitor; when the cutoff voltage level is attained by the charging of the capacitor, the raster display generator provides a signal to automatically turn the beam of the oscilloscope off. The raster display generator includes a constant current generator circuit to charge a preselected capacitor of the group linearly, thus providing practically zero slope to the displayed raster sweeps.

One object of this invention is to provide a raster display generator for displaying the output of a spectrum analyzer on a storage oscilloscope.

Another object of this invention is to provide a raster display generator which provides vertical raster display having essentially zero slope.

Still another object of this invention is to provide a raster display generator wherein different steps in a raster display are attained only during flyback time of the sweep from the spectrum analyzer.

Other objects, advantages and novel features of the invention will become apparent from the following detailed description of the invention when considered in conjunction with the accompanying drawings wherein:

DESCRIPTION OF A PREFERRED EMBODIMENT

Figure 2:
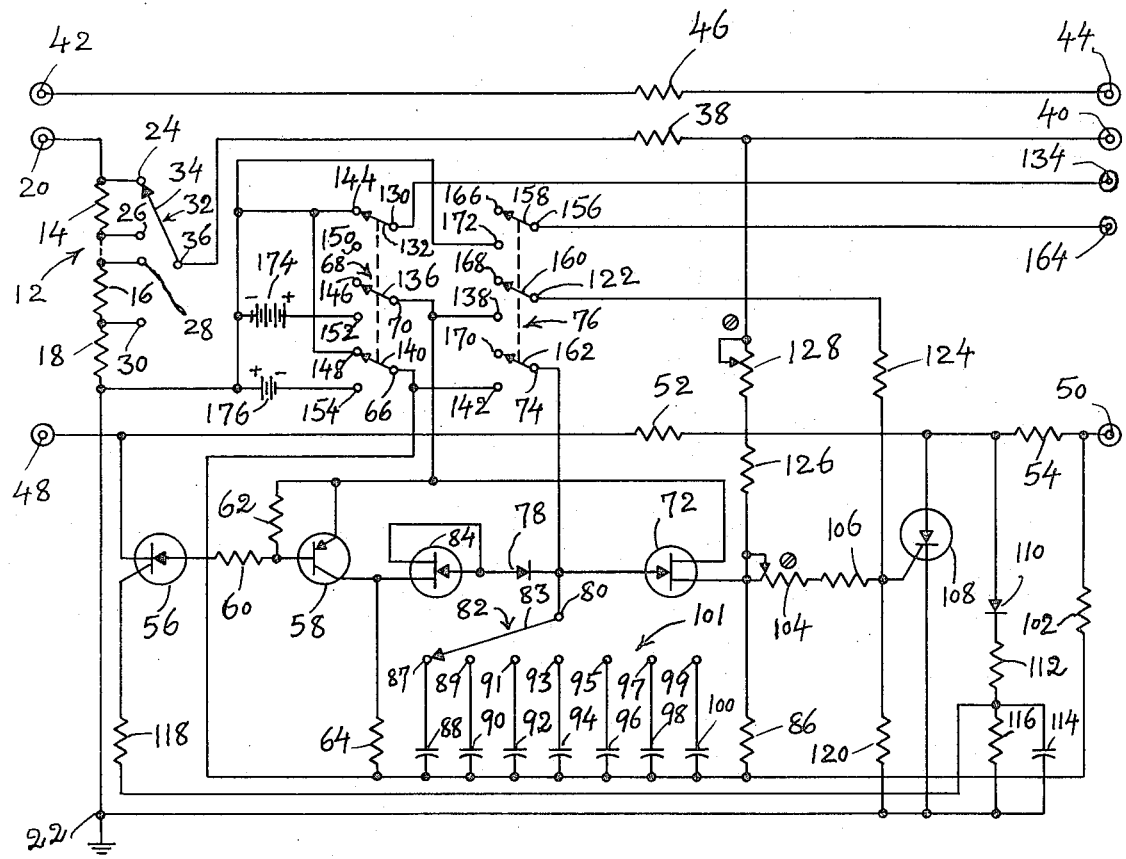
FIG. 2 is a circuit diagram of a raster display generator, showing a preferred embodiment of this invention.

Referring to the drawings wherein like reference characters designate like parts throughout the several views, and more particularly to FIG. 2 thereof, a circuit diagram of a raster display generator is shown. The raster display generator comprises an attenuator 12 including resistors 14, 16 and 18 connected between a point 20 and ground point 22 and having tap points 24, 26, 28 and 30. A switch 32 having a variable arm 34 can select any one of the resistors 14, 16, 18 and combinations thereof, to be a part of the attenuator 12. Point 36 of switch 32 is connected through a resistor 38 to point 40. Points 42 and 44 are connected to each other through a resistor 46. Point 48 is connected to point 50 through resistors 52 and 54. Point 48 is also connected to the cathode electrode of a silicon controlled rectifier (hereinafter referred to as SCR) 56 which has its anode electrode connected to the base electrode of transistor 58 through a resistor 60. The base electrode of transistor 58 is also connected to one end of resistor 62, which has its second end connected to the emitter electrode of transistor 58. The collector electrode of transistor 58 is connected to one end of a resistor 64, which has its other end connected to point 66 of a triple pole double throw switch 68. The common point of resistor 62 and emitter electrode of transistor 58 is connected to point 70 of switch 68 and is also connected to the drain electrode of field effect transistor (hereinafter referred to as FET) 72. The gate electrode of FET 72 is connected to point 74 of a triple pole double throw switch 76 and is also connected to the cathode electrode of a low reverse current diode 78 and to the common point 80 of switch 82 having a variable arm 83. The variable arm 83 of switch 82 can connect point 80 to any one of the points 87, 89, 91, 93, 95, 97, and 99. The anode electrode of diode 78 is connected to the gate electrode of FET 84 and also to the source electrode of FET 84. The drain electrode of FET 84 is connected to the collector electrode of transistor 58. The source electrode of FET 72 is connected to one end of resistor 86, which has its second end connected to one end of each of the capacitors 88, 90, 92, 94, 96, 98 and 100 of capacitor group or bank 101 and to the second end of resistor 64; and to point 50 through resistor 102. The second ends of capacitors 88, 90, 92, 94, 96, 98, and 100 are connected to points 87, 89, 91, 93, 95, 97, and 99 respectively. The source electrode of FET transistor 72 is also connected to one end of a variable resistor 104 which has its second end connected to one end of resistor 106. The second end of resistor 106 is connected to the gate electrode of SCR 108, which has its cathode electrode connected to ground point 22. The anode electrode of SCR 108 is connected to the common point of resistors 52 and 54 and to the anode electrode of diode 110. The cathode electrode of diode 110 is connected to one end of a resistor 112 which has its second end connected to one end of a capacitor 114 and one end of a resistor 116. The common point of resistor 112, capacitor 114, and resistor 116 is connected to the gate electrode of SCR 56 through a resistor 118. The second end of each of capacitor 114 and resistor 116 is connected to ground point 22. The gate electrode of SCR 108 is connected to ground point 22 through a resistor 120. The gate electrode of SCR 108 is also connected to point 122 of switch 76 through a resistor 124. The drain electrode of FET 72 is also connected to the common point of the emitter electrode of transistor 58 and resistor 62. The source electrode of FET 72 is connected to one end of a resistor 126. The other end of resistor 126 is connected to point 40 through a variable resistor 128. Point 130 of switch 68 is connected to movable arm 132 of switch 68 and to point 134. Point 70 is connected to movable arm 136 of switch 68 and is also connected to the common point of resistor 62, emitter electrode of transistor 58, point 138 of switch 76, and the drain electrode of FET 72. Point 66 is connected to movable arm 140 of switch 68 and to point 142 of switch 76. Movable arms 132, 136 and 140 of switch 68 can be connected to either respective points 144, 146, and 148 or respective points 150, 152, and 154. Points 156, 122 and 74 of switch 76 are connected to movable arms 158, 160 and 162 respectively. Point 156 is also connected to point 164. Movable arms 158, 160 and 162 of switch 76 can be connected either to respective points 166, 168 and 170 or to respective points 172, 138 and 142. Point 172 is also connected to points 144, 148 and to ground point 22. Point 152 is connected to one end, preferably the positive terminal, of voltage source 174, preferably a 12 volt source, which has its second end, preferably the negative terminal, connected to ground point 22. Point 154 is connected to one terminal, preferably the negative terminal, of a voltage source 176, preferably a 3 volt source, which has its second terminal, preferably the positive terminal, connected to ground point 22. It is preferable to make most of the connections by using shielded lines in order to avoid distortion of electrical signals. For example, each of points 20, 40, 42, 44, 48, 50, 134 and 164 has, preferably, a coaxial terminal.

OPERATION OF THE CIRCUIT

Figure 1:
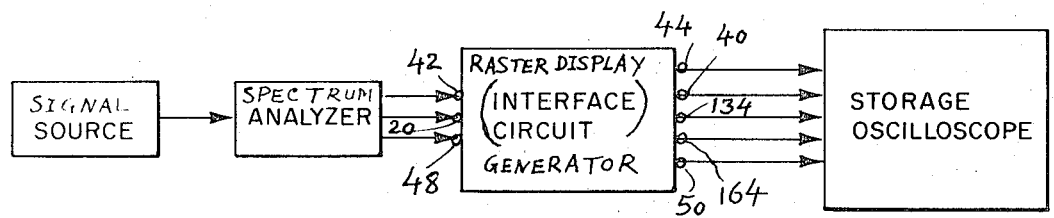
FIG. 1 is a block diagram wherein the raster display generator is shown in the form of an interface circuit between a pulse height analyzer and a storage oscilloscope.

FIG. 1 is a block diagram showing the connection of the raster display generator with a spectrum analyzer connected to one side and a storage oscilloscope connected to the other side of the raster display generator. As an example, a Federal Scientific UBIQUITOUS Spectrum analyzer can be used for this purpose. The sweep output, spectrum output, and unblanking signal output of the analyzer are connected to points 42, 20, and 48 of the raster display generator as shown in FIGS. 1 and 2. Pulse source can be any source of electrical signals, preferably a source of signals coming from an underwater acoustic system such as a series of hydrophones or a noise source. The storage oscilloscope can be a storage oscilloscope such as TEKTRONIX Type 611, which is used for displaying and expanding the utility of the spectrum analyzer. Points 44, 40, 134, 164 and 50 of the raster display generator are connected to X-axis, Y-axis, non-store pin, ERASE pin, and Z-axis respectively of a storage oscilloscope as shown in FIG. 1. The interface circuit is thus a raster display generator adapted to mate a typical spectrum analyzer to a typical storage oscilloscope.

With the interface circuit or raster display generator ON-OFF switch in the OFF position, the sweep, spectrum, and unblanking signals from the spectrum analyzer are connected to points 42, 20, and 48 respectively; points 44, 40 and 50 are connected to X-, Y-, and Z-axes inputs of the oscilloscope respectively; and points 134 and 164 are connected to NON-STORE and ERASE terminals of the oscilloscope. The oscilloscope is switched to the NON-STORE mode. This produces the normal oscilloscope display. The attenuator 12 adjusts the amplitude of the display spectrum.

To produce the raster of sweeps, one of the capacitors in group 101 of capacitors 88, 90, 92, 94, 96, 98 and 100, which is preselected by varying the movable arm 83 of switch 82, is charged uniformly in discrete steps, one step per sweep. The resulting D.C. voltage level is superimposed on the spectrum output signal of the analyzer. The step generator circuit of the raster display generator is controlled by the unblanking output of the analyzer so that the preselected capacitor is charged only during the sweep flyback interval, i.e., the period of time between the end of one sweep and the start of the next sweep. The unblanking voltage pulse appearing at point 48 remains at a fixed voltage, preferably zero volts, during the flyback interval.

With the ON-OFF switch 68 in the ON position (i.e., movable arms 132, 136 and 140 connecting points 130, 70 and 66 to the respective points 150, 152 and 154) the raster display generator is turned on and the oscilloscope is in the storage mode. This provides biasing voltages for different transistors of the raster display generator from voltage sources 174 and 176. The unblanking pulse of +6 volts keeps SCR 56 reverse biased and thus stops the operation of the step generator until the first sweep is completed. From point 50 of the generator circuit, a signal is provided to the Z-axis of the oscilloscope to turn the beam of the oscilloscope on. After the first sweep, the unblanking pulse goes to zero volts during the flyback time and SCR 56 conducts the unblanking pulses to the inverter transistor 58. A constant voltage pulse from the inverter transistor 58 drives constant current generator or FET 84, which charges the capacitor from group 101 selected by switch 82. Between flyback intervals of unblanking pulses, low reverse current diode 78 prevents discharging of the preselected capacitor back through constant current generator 84. Source follower or FET 72 further minimized discharge of the preselected capacitor by isolating it from the loading affect of the HEIGHT ADJUST and CUT-OFF ADJUST circuitry, i.e., the remaining part of the raster display generator circuit. The stepping voltage from source follower 72 is mixed with the spectrum signal via the HEIGHT ADJUST, variable resistor 128 and the resistor 126, thus each sweep appearing on the oscilloscope face being positioned above the previous sweep. Switch 82 adjusts the spacing of the sweeps of the raster by selecting one of the capacitors from the group 101 of capacitors 88, 90, 92, 94, 96, 98 and 100. At any one setting of switch 82, the sweep spacing is even because the preselected capacitor is uniformly charged for a constant time, i.e., the length of flyback interval of the unblanking pulse, and with a constant current from constant current generator 84. The smaller the value of the preselected capacitor, the greater will be the spacing of the sweep of the raster. It is preferable that the voltages of source 174 and 176 are 12 volts and 3 volts respectively. Thus the inverter transistor 58 and source follower 72 are energized by a 12 volt source.

When the preselected capacitor's voltage approaches 12 volts, a constant current generator 84 can no longer maintain a constant charging current and the sweep spacing diminishes.

In order to prevent the crowded sweeps from being displayed on the storage oscilloscope from then on, SCR 108 shorts out the Z-axis writing beam signal to the oscilloscope at an adjustable point before this affect appears. The cutoff point where SCR 108 shorts out the Z-axis writing beam signal is controlled by a variable resistor 104 which acts as CUT-OFF ADJUST. A variable resistor 128 together with resistor 126 acts as HEIGHT ADJUST which controls the voltage output of the raster display circuit which is mixed with the spectrum signal from the analyzer. With switch 68 in the ON position and switch 76 in the downward position; i.e., movable arms 158, 160, 162 join points 156, 122 and 74 to the respective points 172, 138, and 142; the preselected capacitor is shorted out via points 80, 74, 142 and the selected point out of points 87, 89, 91, 93, 95, 97, 99 which is selected by the movable arm 83 of switch 82 and is joined to point 80. Thus in this position of switch 76, the charge on the preselected capacitor is dissipated. Furthermore, point 164 is shorted to the ground point 22, thus grounding the ERASE terminal of the oscilloscope. Furthermore, in the downward position of switch 76, 12 volts is applied across the combination of resistors 124 and 120 and ground point 22. It provides sufficient gate current to make SCR 108 conduct, thus turning off the Z-axis writing beam of the oscilloscope.

When switch 68 is in ON position and switch 76 is in WRITE position (i.e., movable arms 158, 160, 162, joining points 156, 122 and 74 to the respective points 166, 168, and 170); and movable arm 83 of switch 82 is connecting point 80 to one of the points 87, 89, 91, 93, 95, 97 and 99 to preselect one of the capacitors from group 101; transistor 56 is inhibited due to unblanking pulse of +6 volts being applied to the cathode of SCR 56, and no charging of the preselected capacitor takes place. However, during the flyback time interval of the sweep, the unblanking pulse goes down to zero volts, which makes SCR 56 conduct and thereby the inverter transistor 58 provides a constant voltage pulse to the constant current generator 84, which starts charging the preselected capacitor in group 101. As mentioned before, the discharge of the preselected capacitor is prevented by low reverse current diode 78. The source follower then allows a voltage on the preselected capacitor to pass therethrough. This voltage signal is adjusted for amplitude by varying variable resistor 128 before it is mixed with the analyzer spectrum signals and applied to the Y-axis of the oscilloscope for displaying. With the switch 76 in that position, 3 volts supply is used to keep the output of source follower at zero level in the absence of a raster display signal. When there is enough raster display voltage developed, enough gate current in SCR 108 is developed which makes SCR 108 conduct and thus turns the Z-axis writing beam of the oscilloscope off. The level at which the turning off of the Z-axis writing beam of the oscilloscope takes place is determined by the position of CUT-OFF ADJUST control. If it is desired to erase the raster display before the cutoff level is reached, switch 76 is put in the second position (i.e., movable arm 162 of switch 76 joining points 74 and 142). This discharges the preselected capacitor and erases the raster display on the oscilloscope. At the same time, with the switch 76 in that position, 12 volts signal through resistor 124 provides sufficient gate current to make SCR conduct, thus turning off the Z-axis writing beam of the oscilloscope. The circuit comprising diode 110, resistor 112 and capacitor 114, and resistor 116 provides delay time in the circuit so that the SCR 56 starts conducting only at the end of the first sweep cycle.

Thus the raster display generator of this invention comprises a group of capacitors wherein one of the capacitors in the group is charged uniformly by a in discrete steps constant current generator circuit only during a constant time interval equaling the flyback time of each sweep and the raster display voltage signal thus produced is mixed with the spectrum signals to display on a storage oscilloscope.

Obviously man modifications and variations of the present invention are possible in the light of above teachings. As an example, it is possible to use a different method for charging uniformly one of the capacitors in the capacitor bank or group during a fixed interval of time to obtain a step voltage signal and thus producing a raster display with essentially zero slope.

It is therefore understood that within the scope of the appended claims the invention may be practiced otherwise than as specifically described.

I claim:
1. A raster display generator comprising a group of capacitors, each capacitor having a first terminal and a second terminal, the first terminal of each capacitor of said group being connected to a first common terminal;

a switching means for connecting the second terminal of a selected capacitor of said group of capacitors to a second common point;

means for charging the selected capacitor uniformly in discrete steps for a preset period of time and obtaining a raster display voltage signal therefrom;

means for mixing said raster display voltage signal with a plurality of voltage signals to be analyzed; and means for discharging the selected capacitor before generation of a new raster display voltage signal.

2. The generator of claim 1 wherein the means for charging the selected capacitor of said group of capacitors uniformly in discrete steps further comprises a constant current generator circuit.

3. The raster display generator of claim 2 wherein said constant current generator circuit includes a low reverse current diode.

4. The raster display generator of claim 3 wherein said constant current generator circuit further comprises a first FET acting as a constant current generator and a second FET acting as a source follower and a voltage source.

5. The raster display generator of claim 1 wherein said preset time for charging the selected capacitor of said group of capacitors uniformly in discrete steps is the flyback interval of an unblanking signal of a spectrum analyzer during a sweep cycle thereof.

6. The raster display generator of claim 1 wherein the means for mixing said voltage signal further comprises a HEIGHT ADJUST and a CUT-OFF ADJUST means for setting a limit to which the selected capacitor of said group of capacitors is charged before discharging the selected capacitor for starting a new raster display.

\* \* \* \* \*